174-94

SEARCH ROOM

BEST AVAILABLE COPY

Oct. 7, 1969 W. F. BROSKE Re. 26,685

EXPLOSIVELY-FORMED ELECTRICAL CONNECTION

Original Filed May 14, 1965 4 Sheets-Sheet 1

INVENTOR.
WILLIAM F. BROSKE
BY Curtis, Morris, Safford

EXPLOSIVELY-FORMED ELECTRICAL CONNECTION
Original Filed May 14, 1965 4 Sheets-Sheet 2
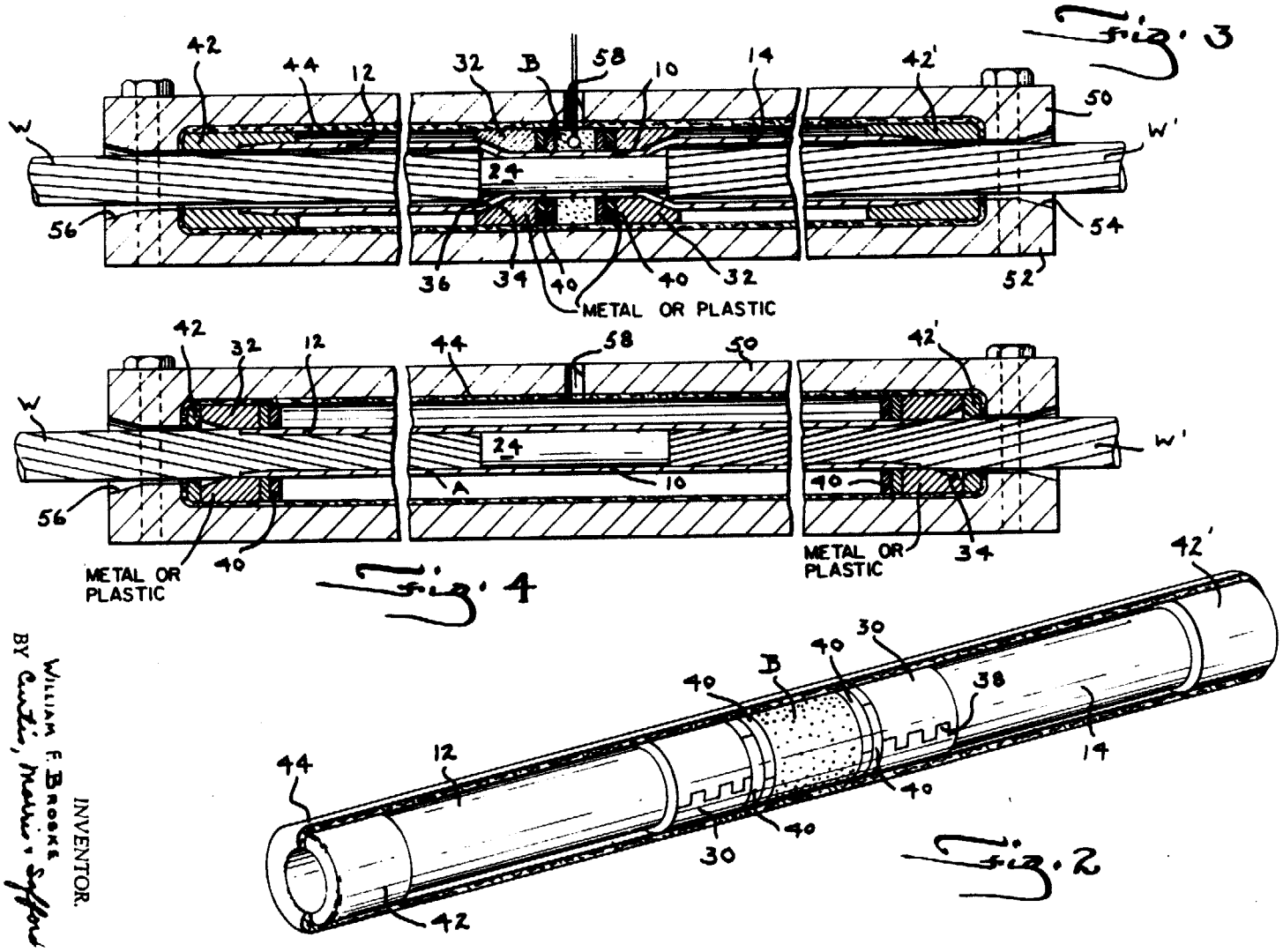
INVENTOR.
WILLIAM F. BROSKE
BY Curtis, Morris & Safford

EXPLOSIVELY-FORMED ELECTRICAL CONNECTION

Original Filed May 14, 1965 4 Sheets-Sheet 3

INVENTOR.
WILLIAM F. BROSKE
BY Curtis, Morris & Safford

EXPLOSIVELY-FORMED ELECTRICAL CONNECTION

Original Filed May 14, 1965 4 Sheets-Sheet 4

INVENTOR.
WILLIAM F. BROSKE
BY Curtis, Morris & Safford

United States Patent Office

Re. 26,685
Reissued Oct. 7, 1969

26,685
EXPLOSIVELY-FORMED ELECTRICAL CONNECTION

William F. Broske, Camp Hill, Pa., assignor to AMP Incorporated, Harrisburg, Pa.

Original No. 3,341,650, dated Sept. 12, 1967, Ser. No. 455,818, May 14, 1965, which is a continuation-in-part of application Ser. No. 424,041, Jan. 7, 1965. Application for reissue Oct. 5, 1967, Ser. No. 676,662
Int. Cl. H02g *15/08*
U.S. Cl. 174—94 8 Claims

Matter enclosed in heavy brackets [ ] appears in the original patent but forms no part of this reissue specification; matter printed in italics indicates the additions made by reissue.

*ABSTRACT OF THE DISCLOSURE*

*This invention relates to a connector for joining conductors whereby a die member is explosively-driven to cold-forge the connector onto the conductor.*

This constitutes a continuation-in-part application of my prior application, Ser. No. 424,041, filed Jan. 7, 1965, now abandoned.

The art of joining electrical conductors requires a secure connection that will withstand vibration, corrosion, tensile failure, and concurrently provide a low millivolt drop through the connection. The art of joining electrical utility conductors is further complicated by the large sizes of the conductors (e.g., 4/0 and larger), as well as the fact that the connections are made at remote locations where auxiliary power is not available. Additionally, these connections must withstand the elements with a life expectancy of at least twenty years.

In view of these requirements, a suitable way of cold-forging a connection onto a pair of utility wires is accomplished by the application of energy generated by an explosive. It is an object of this invention to provide an explosively-powered means for splicing large-sized wires with ease of operation and concomitant excellence of the connection.

It is also an object of this invention to provide such a connection that is easily applied and available at a very reasonble cost.

It is also an object of this invention to cold-forge a connection onto aluminum-stranded wire having a steel reinforcing means, whereby the connector is deformed onto the steel strand as well as onto the aluminum strands.

Other objects and attainments of the present invention will become apparent to those skilled in the art upon a reading of the following detailed description when taken in conjunction with the drawings in which there are shown and described illustrative embodiments of the invention[; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use].

In the drawings:

FIGURE 2 is a perspective view, partially broken away, showing the device of FIGURE 1 in assembled condition;

FIGURE 3 is a sectional view showing the device of FIGURES 1 and 2 prior to application;

FIGURE 4 is a view similar to FIGURE 3 showing the device after application;

Figure 1:
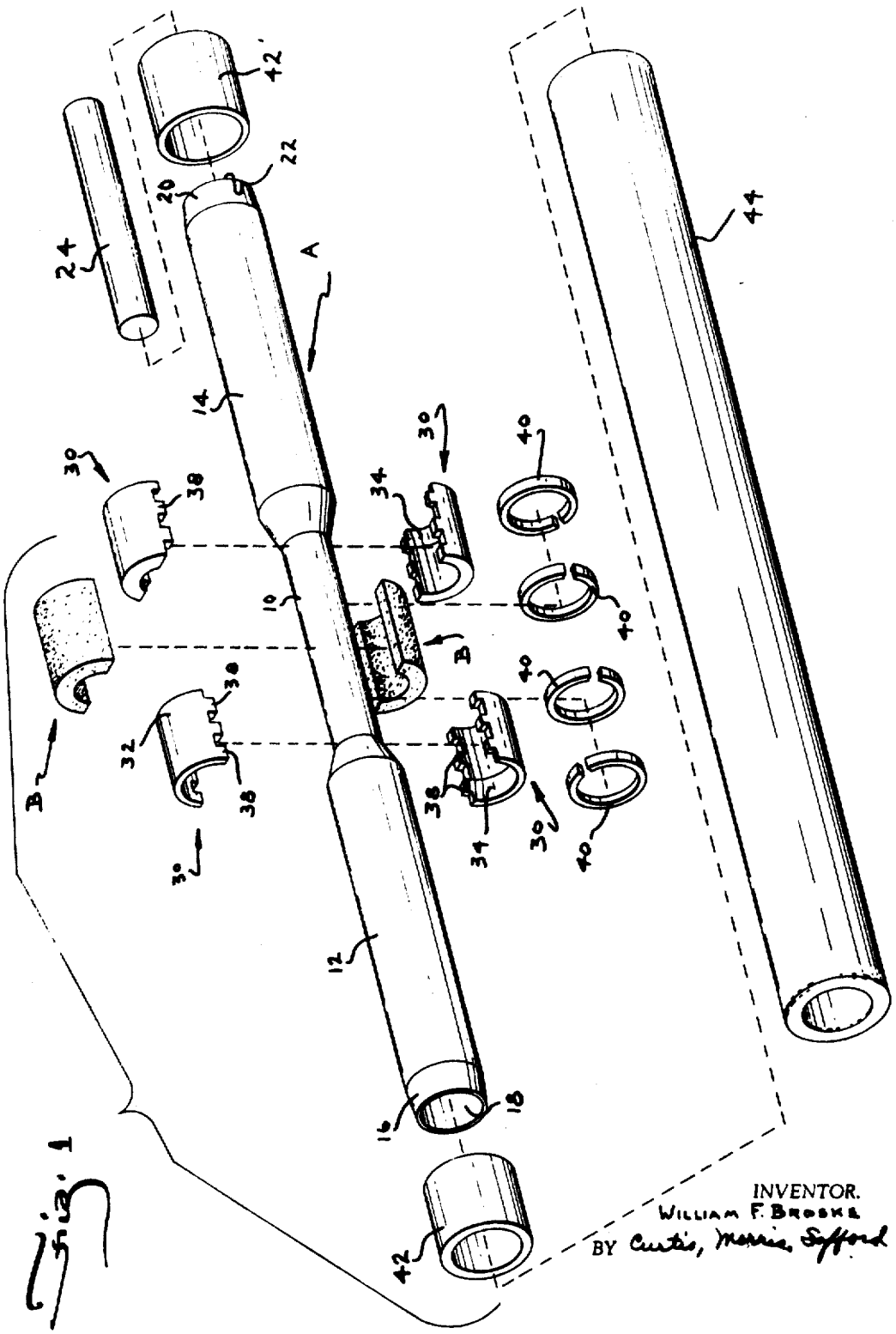
FIGURE 1 is an exploded view illustrating the various components of a connector embodying the principles of this invention.

As shown in FIGURE 1, the central connecting member, generally indicated A, includes a ferrule-shaped member having a central section 10 of reduced diameter which flares into a pair of conductor-receiving sections 12 and 14 of a greater diameter. The conductor-receiving member 12 has a tapered outer surface 16 at its mouth 18. The conductor-receiving member 14 has a similar tapered outer surface 20 at its mouth 22. The inner diameters of members 12 and 14 are adapted to receive (FIGURE 3) a pair of wires W, W', respectively.

A solid rod 24 (FIGURE 1) is inserted into the central portion 10 of the connecting member A. This rod is approximately the same length as the central section 10.

A die member 30 (FIGURE 1) is formed in two parts, 32 and 34, which, when joined together, complement each other to form a right-circular cylinder. These die members have tapered outer surfaces 36 (FIGURE 3). As shown in FIGURE 1, the outer edges of the die half 32 include a series of projections 38 with corresponding indentations therebetween. The projections and indentations are designed so that the projections on one half are offset with the indentations on the other half. A friction-fit between the projection and the indentation permits the dies to be assembled, forming the cylindrical member 30; the other die being identical except that it tapers in the opposite direction. These dies may be made out of a suitable metal, or even a sufficiently stiff plastic such as Lexan or Synthane.

A series of seals 40 are also constructed as split rings for ease of assembly. A pair of these seals is fitted around the central section 10 of the connecting member A on each side of an explosive charge B adjacent the untapered portion of each of the dies 30. These seals are for the purpose of confining the gas generated during the explosive cycle and may be made out of linear polyethylene. The split sections of the seals are misaligned to lessen the possibility of gas blowout.

A cylindrically-shaped, cushioning device 42, 42' is inserted around each open end of the conductor-receiving members 12 and 14. As shown in FIGURE 3, these cushioning devices are tapered on their inside surfaces to match the corresponding surfaces 16 and 18 on the outer surfaces of the conductor-receiving members.

The powder charge B is contained between the gas seals 40 and may be either a molded charge or a quantity of granulated explosive powders properly held in position. One means of retaining the entire assembly in operating condition includes a tubular, stiff, paper cylinder 44 of sufficient length to encompass all the components. The outer ends of the cylinder are turned over (FIGURE 2) to retain the parts in assembled condition.

The device may be inserted into any suitable chamber capable of permitting detonation. The chamber, shown in FIGURES 3 and 4, includes a pair of identical connector-receiving portions 50 and 52. These sections may be made of cold-rolled steel and bolted together to retain the connector therein. A pair of tapered apertures 54, 56 permits insertion of the wires W, W' during the connecting cycle. A minor aperture 58 in one of the sections permits insertion of a detonator (e.g., electrical match) for access to powder charge B.

Figure 7:
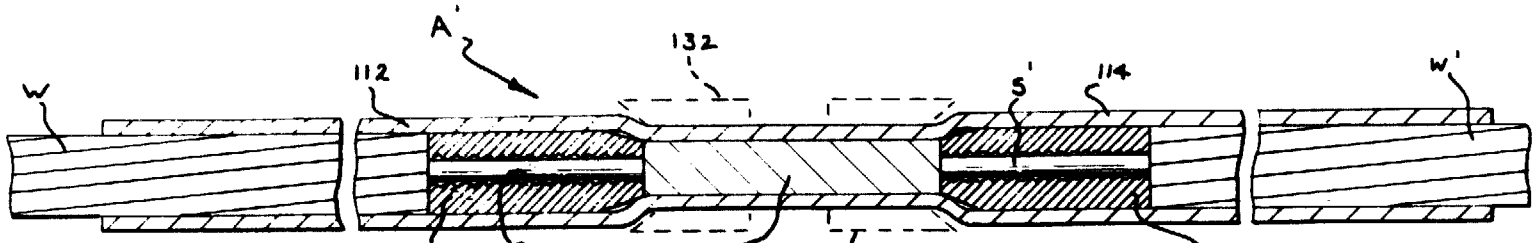
FIGURE 7 is a sectional view of another embodiment of a connector employing the principles of the invention in assembled condition prior to being secured to the wire.
Figure 8:
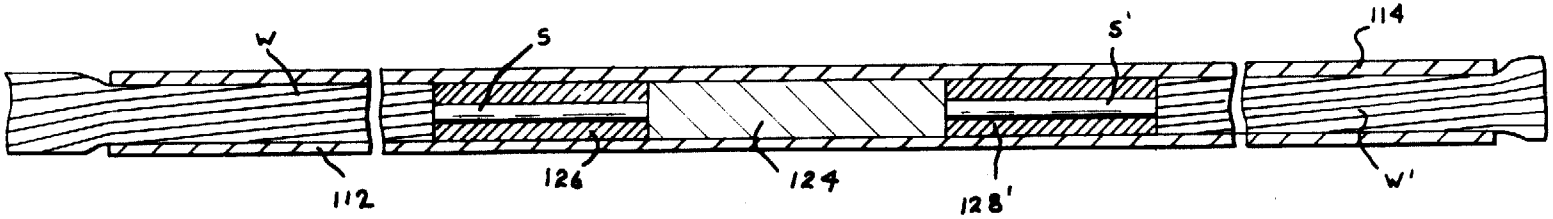
FIGURE 8 is a view similar to FIGURE 7 illustrating the device after application.

Another embodiment of the invention is shown in FIGURES 7 and 8. In this embodiment, means is provided for gripping the steel strands S, S'. The device illustrated in FIGURES 7 and 8 is similar in most respects to the device shown in FIGURES 1–4. It includes a connector A' comprised of a central section 110, and conductor-receiving sections 112 and 114 having tapered surfaces 116 and 120 at the respective mouths 118 and 122. A solid rod 124 is disposed within the central section 110.

A pair of collars 126 and 128 are also disposed within the connector A'. As shown in FIGURE 7, the collars are concentric with the connector A', with one of the collars disposed on each side of the central rod 124. The collars 126 and 128 have an outside diameter slightly smaller than the inside diameter of the conductor-receiving sections 112 and 114 to provide an interference fit. Alternatively, the collars 126, 128 and the central rod 124 could be made integral. In the event that they are made integral, the outer tube of the connector A' may be made of constant diameters and the central section reduced in diameter after the integral member is inserted. It is noted that the central aperture of the collars 126 are of sufficient diameter to accommodate the steel strands S, S'.

Figures 5, 6:
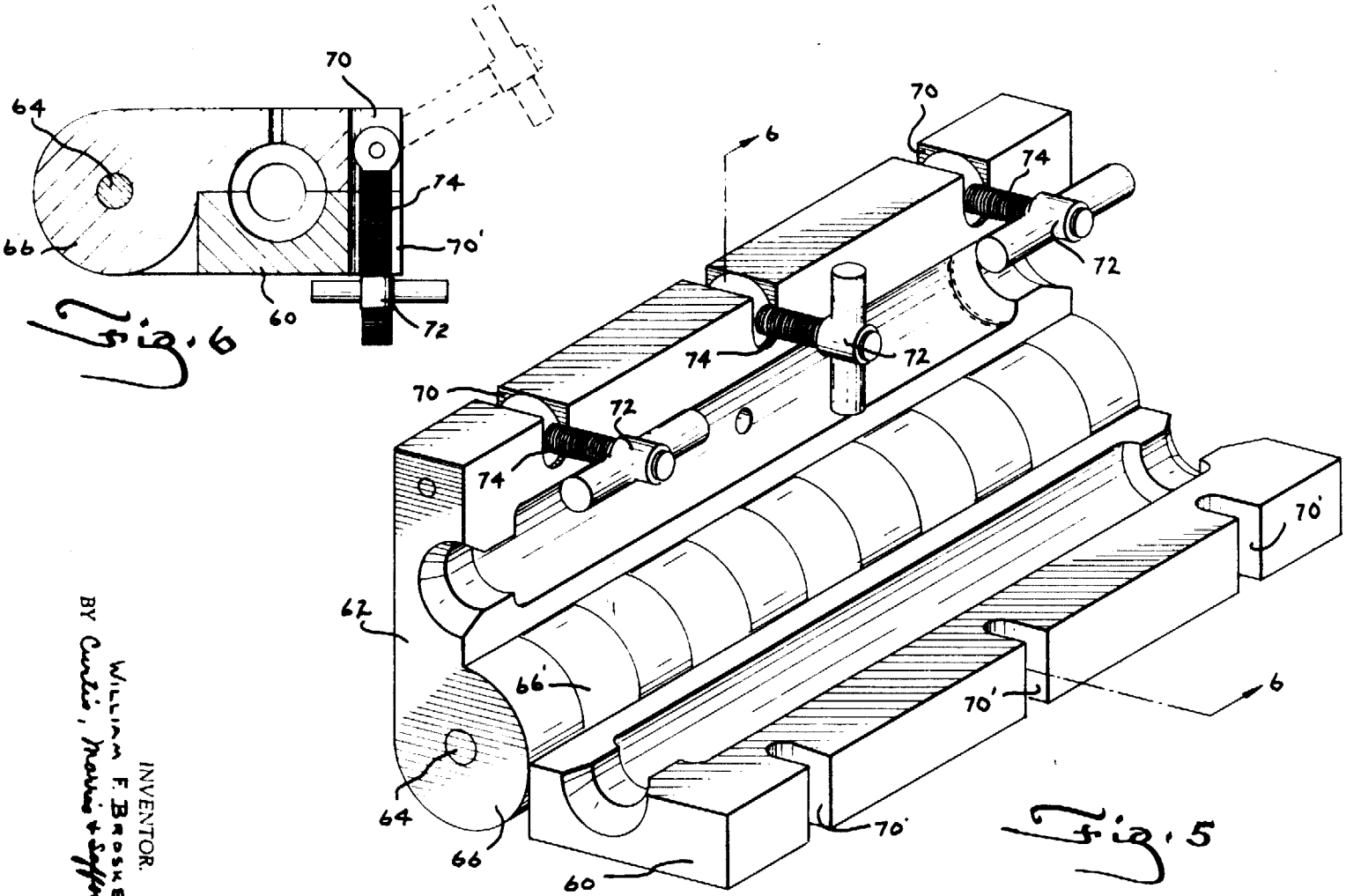
FIGURE 5 is a perspective view of another embodiment of a tool for containing a connector during the assembly cycle.
FIGURE 6 is a sectional view taken through plane 6—6 of FIGURE 5.

Another embodiment of a device for containing the wires, connector and powder charge is shown in FIGURES 5 and 6. A chamber having complementary connector-receiving portions 60 and 62 is secured along one edge of these portions by pivot pin 64 which passes through piano-hinge portions 66, 66'. The opposite edge of each portion has U-shaped recesses 70, 70'. A series of handles are threadedly connected to pivoted rods 74 in the U-shaped recesses of connector-receiving portion 62.

The connector-receiving portions 60 and 62 may be closed (FIGURE 6) to encompass the connector and wires in the same manner as the device shown in FIGURES 3 and 4. The rods 74 are pivoted into the recesses 70', and the handles 72 are tightened to firmly secure the portions 60 and 62 together.

Operation.—When it is desired to splice a pair of wires W, W', the connector is assembled in the manner illustrated in FIGURE 3. The connector is retained in the tool sections 50, 52, with the wires extending through the apertures 54, 56. The tool is bolted together and an electric match inserted into the aperture 58. Excitation of the electric match by standard voltage causes it to ignite, thereby detonating the powder charge B.

Detonation of the powder drives the dies 30 outwardly and causes cold-forging of the ferrule portions 12 and 14 onto the wires W, W'. The resistance of the metal to cold-forging reduces the speed of the dies as they travel outwardly. At their outer limits, the dies meet with further resistance when they contact cushioning members 42, 42'. Longitudinal deformation of these cushioning members prevents further travel of the dies 30. The tool may then be unbolted and a secure electrical connection is formed.

It is noted that between forty and fifty grains of "Bull's Eye" or "Unique" powder may be used in connecting 4/0 ACSR wires to each other. The connecting member A may be made of aluminum.

The embodiment shown in FIGURES 7 and 8 is, in most respects, identical with the embodiment of FIGURES 1–4. However, in preparing the wires W, W', the outer strands are stripped back to expose the central steel strands S, S'. When positioning the wires W, W' in the connector A', the central steel strand S is positioned within the collar 126, with the end of the other strands of the wire W abutting the collar S. The wire W' is inserted in the opposite end of the connector in the same manner.

In operation, the actuation of dies 132 (in the same manner as the previous embodiment) compresses the collars 126, 128 onto the steel strands S, S', respectively, and concurrently the outer sections 112, 114 of the metallic tube onto the collars 126, 128. Since the strongest strand of the wires is directly secured to the connector, the tensile strength of the connection is increased.

[Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.]

I claim:

1. A connector for splicing conductors comprising: a ferrule adapted to receive [an electrical] *a* conductor, an explosive charge surrounding the outer surface of the central portion of the ferrule, means disposed on said ferrule actuated by the explosive charge for cold-forging the ferrule to the conductor.

2. An electrical connector for splicing an electrical conductor comprising: a ferrule adapted to receive a conductor therein, an explosive charge located on and surrounding the outside surface of the central portion of the ferrule, a first cylindrically-shaped die surrounding said ferrule adjacent one side of the explosive charge and a second cylindrically-shaped die surrounding said ferrule adjacent the other side of the explosive charge.

3. A connector adapted to receive a pair of conductors, said connector having a minor diameter in the central section and a major diameter in the outside sections, a cylindrically-shaped explosive charge on the mid-portion of the central section surrounding the outer surface thereof, and a pair of cylindrical dies disposed about the minor diameter, one on each side of the explosive charge.

4. The device of claim 3 wherein the dies are made of plastic material.

5. The device of claim 3 wherein the dies taper outwardly from a thicker section at the inside edge to a thinner section at the outside edge.

6. The device of claim 3 wherein the central section is solid.

7. A device for connecting stranded cable comprising a tubular metallic member adapted to receive a length of stranded cable in each end thereof, explosive means surrounding the exterior central section of said tubular member, a pair of die means, each of said die means located adjacent said explosive means and adapted to be driven outwardly to cold-forge the tubular member onto the cable, a metal sleeve located within the tubular member adapted to encompass a strand of said cable, and means for retaining said dies and explosive means on the outer surface of said tubular member.

8. A connector for joining cable comprising: a tubular metal member, a die means surrounding the exterior of the tubular metal member, said die means comprising a pair of dies having an inner surface conforming to the outer surface of the tubular member, an explosive member located between said dies, and a pair of circular metal collars located within the tubular member with one of said collars positioned outwardly of one of said dies and the other collar positioned outwardly of the other of said dies.

References Cited

The following references, cited by the Examiner, are of record in the patented file of this patent or the original patent.

UNITED STATES PATENTS

| | | | |
|---|---|---|---|
| 2,052,958 | 9/1936 | Webb. | |
| 3,333,046 | 7/1967 | Margis | 174—84 |

DARRELL L. CLAY, Primary Examiner

U.S. Cl. X.R.

29—254, 421, 628; 174—90; 287—101; 339—276